A. W. HAM.
TROLLEY MECHANISM.
APPLICATION FILED APR. 12, 1919.

1,358,439.  Patented Nov. 9, 1920.

Witness
Floyd R. Cornwall

Inventor.
Albert W. Ham
By Jas. L. Skidmore
his Attorney.

UNITED STATES PATENT OFFICE.

ALBERT W. HAM, OF TROY, NEW YORK.

TROLLEY MECHANISM.

1,358,439.  Specification of Letters Patent.  Patented Nov. 9, 1920.

Application filed April 12, 1919. Serial No. 289,511.

*To all whom it may concern:*

Be it known that I, ALBERT W. HAM, a citizen of the United States, residing at Troy, in the county of Rensselaer and State of New York, have invented certain new and useful Improvements in Trolley Mechanism, of which the following is a specification.

This invention relates to a trolley base improvement, and is provided with means especially designed to prevent damage to overhead construction.

The prime object of the invention is to provide simple, durable and reliable means, connected with the base and trolley pole, for effectively controlling the overhead trolley to prevent its entanglement with the cross wires and thereby damaging the same when the trolley escapes from the feed wire.

A further object is to construct an attachment of a novel character which may be readily secured to any of the well known trolley bases without any material alteration to their parts, and adapted to withstand the required conditions of service.

Another object of this invention is to provide an overhead trolley construction that will serve to prevent the springs which retain the trolley on contact with the feed wire from being distorted in the event of the trolley wheel escaping from or leaving the feed wire.

Another object of the invention is to provide self-releasing trolley-retaining mechanism in which the escape of the trolley wheel from the feed wire automatically releases the tension of the retaining springs and allows the trolley pole to drop down out of the way of the overhead suspension device; the mechanism being reset and the tension of its springs restored by a downward pull on the trolley pole.

The foregoing and such other objects as may appear from the ensuing description are attained by the novel features of construction, combination, arrangement and location of the parts hereinafter more fully described, illustrated in the accompanying drawings, and particularly pointed out in the claims appended hereto, it being understood that slight changes in the precise form, proportion, and minor details of the construction may be resorted to without departing from the spirit or sacrificing any of the advantages of the invention.

Figure 1:
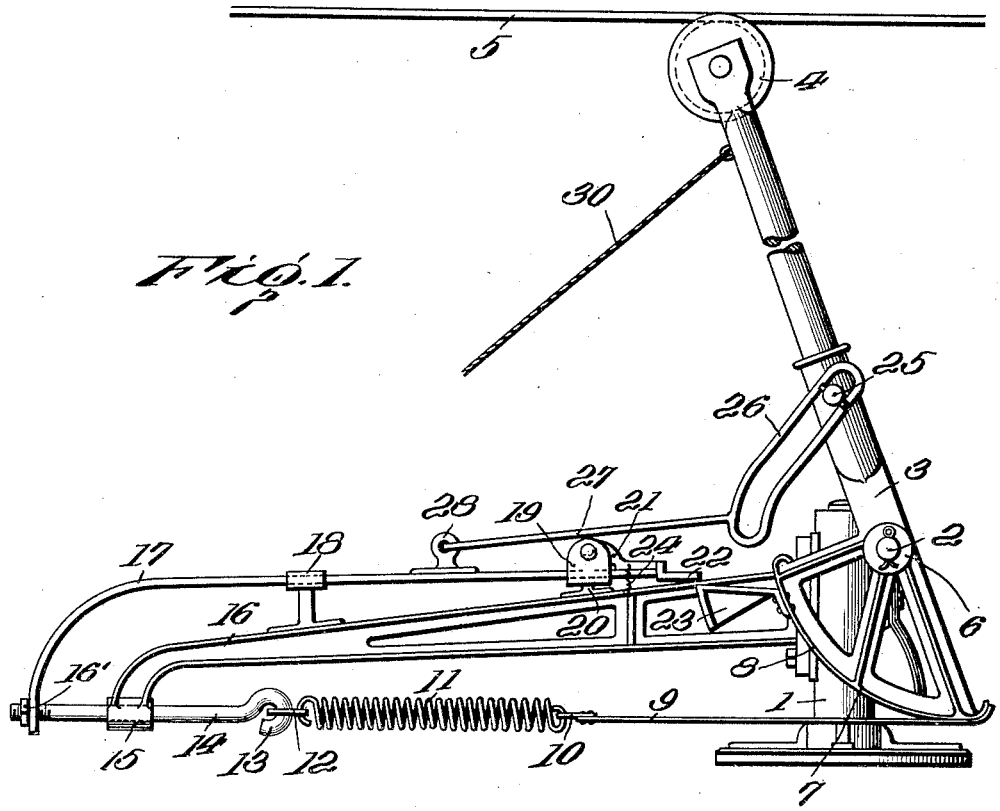
Figure 2:
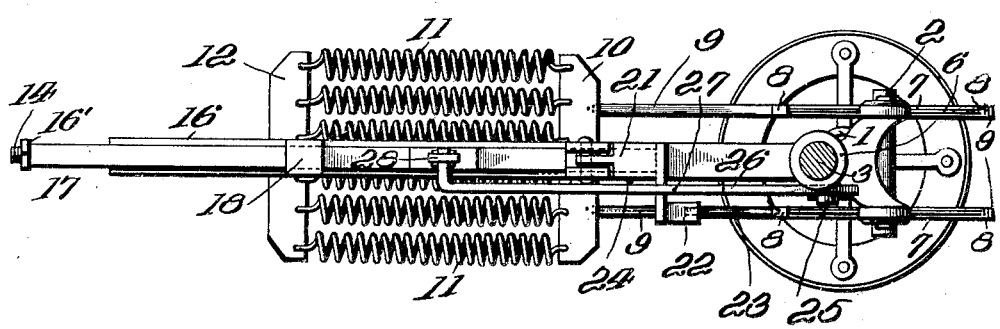

In the accompanying drawings which form a part of this specification it will be seen that:

Figure 1 is a side elevation of the device embodying my invention, showing the trolley in operative position on the trolley wire, and Fig. 2 is a plan view of the improved mechanism.

Similar numerals of reference are employed to designate like or equivalent parts wherever found throughout the several views.

In carrying out this invention, as illustrated, it will be seen that the numeral 1 indicates a base member, to which is pivotally secured in any suitable manner by a shaft 2 the trolley pole 3, which is provided at its upper end with a trolley wheel 4, which is adapted to engage the trolley or feed wire 5. Secured to the lowermost end portion of the pole is the metallic member 6 formed with two outward and downwardly extending rocker arms 7, each of said arms having a curved rim portion 8, and suitably secured to lowermost portion of each rim is a strap of sheet steel or any other desirable material 9, which extends rearwardly and is fixedly secured to a metallic plate 10, to which plate one end of a series of coiled base springs 11 are removably secured, the other end of each of said springs being removably fastened to a similar metallic plate 12, said plate being provided with an aperture at its central portion adapted to receive the hooked end portion 13 of a rod 14, which extends rearwardly, passing through a guideway 15 formed integral with the rear end of a metallic reach arm 16, the front end of said arm being suitably secured to the base member 1. Secured to the threaded outer end portion of the rod 14, by a securing nut 16' is an upwardly and forwardly curved plate or bar 17, which extends forwardly, passing through guideways 18 and 19, mounted on the upper surface of the arm 16, said bar 17 terminating in advance of the guideway 19. Pivotally secured to the upper portion of the metallic member 20, through which the guideway 19 is formed, is a movable latch member 21 provided with an integral lateral and forward extension 22, which normally overlaps a metallic rearward extension 23 fixedly secured to one of the rocker arms 7 forming a part of the metallic member 6, said member 21 having secured to one side thereof one end of a coiled spring 24, the other end of said spring being secured to the upper rim portion of the arm 16.

Secured to the pole in any suitable or desirable manner is a member 25 adapted to engage with a link 26 having connected thereto a rod 27, the rear hooked end portion of the latter passing through an aperture formed in a member 28 rigidly secured to the plate or bar 17.

It will be readily perceived that when the trolley is set for operation in contact with the trolley or feed wire the base springs 11 will be under tension, hence when the trolley leaves or escapes from the said wire the pole will swing on its pivot until the extension 23 engages with and lifts the movable member 21 out of the path of the front end portion of the plate or bar 17, which will immediately move forward, simultaneously releasing the tension of the series of base springs 11, and thus permitting the trolley wheel to move into a position below the span wires and thereby preventing any damage to or entanglement with the overhead wires, and when it is desired to reset the device for operation it is simply necessary to make a sufficient downward pull on the trolley rope 30, when the member 25 secured to the trolley pole will engage with the lower end of the slot in link 26, and will force the bar 17 rearwardly through the medium of the rod 27, and member 28, at the same time the arms 7 moving downwardly and forwardly, the extension 23 will also move downward and forward, thus allowing the movable member 21 to be returned by the tension of the coiled spring 24 in the path of the bar 17, and above the said extension, whereby the said bar is held and locked under tension of the base springs by the movable latch or locking member 21, as will be readily understood by those skilled in the art to which this invention relates.

It is believed the construction and operation of my improved mechanism will be readily understood, hence further description of the device is not deemed necessary.

Having thus described my invention, what I claim and desire to secure by Letters Patent is:

1. A device of the character described, comprising a base member, a trolley pole pivotally secured to said member, rocker arms secured to the lower portion of said pole, a plurality of base springs secured at one end to the rocker arms, a reach arm secured to the base member having an integral guideway formed at its rear end and a plurality of guideways supported on its upper surface, a movable bar connected to the other end of said springs and passing through said guideways, a latch carried by the reach arm for locking and unlocking the movable bar, a trip secured to one of the rocker arms for unlocking said latch, and means connected to and operated by the trolley pole to restore tension to said springs.

2. A device of the character described, comprising a base member, a trolley pole pivotally secured to said member, a reach arm secured to the base member, rocker arms secured at the lower portion of the pole, a trip extension rigidly secured to one of the rocker arms, a plurality of base springs secured at one end to the rocker arms, a slidable bar secured to the other end of said springs, a spring pressed movable latch member carried by the reach arm for locking said bar, and means connected to said bar and pole for operating the bar by the movement of the pole.

3. A device of the character described, comprising a base member, a trolley pole pivotally secured to said member, a reach arm secured to the base member, rocker arms secured to the lower end of the pole, a plurality of base springs secured at one end to the rocker arms, a slidable bar secured to the other end of said springs, a movable pivoted latch member carried by the reach arm for locking the bar, means secured to one of the rocker arms for lifting the movable latch member to release the tension of the said springs, and means connected to said bar and pole to restore tension to said springs.

ALBERT W. HAM.